United States Patent [19]

Kawabata

[11] Patent Number: 4,637,705

[45] Date of Patent: Jan. 20, 1987

[54] AUTOMATIC FOCUSING CAMERA

[75] Inventor: Takashi Kawabata, Kanagawa, Japan

[73] Assignee: Canon Kabushiki Kaisha, Tokyo, Japan

[21] Appl. No.: 701,969

[22] Filed: Feb. 15, 1985

[30] Foreign Application Priority Data

Feb. 18, 1984 [JP] Japan .................... 59-29075

[51] Int. Cl.⁴ .............................................. G03B 3/00
[52] U.S. Cl. .................................................. 354/403
[58] Field of Search ........................ 354/400, 402, 403

[56] References Cited

U.S. PATENT DOCUMENTS

| | | | |
|---|---|---|---|
| 4,251,144 | 2/1981 | Matsuda et al. | 354/403 |
| 4,300,823 | 11/1981 | Yamanaka et al. | 354/403 |
| 4,367,934 | 1/1983 | Matsui | 354/403 |
| 4,470,681 | 9/1984 | Johnson | 354/403 |

*Primary Examiner*—Russell E. Adams
*Attorney, Agent, or Firm*—Toren, McGeady, Stanger, Goldberg & Kiel

[57] ABSTRACT

Disclosed is a camera having a plurality of range finder areas in the field of view upon distance measurement thereof to provide information for focusing adjustment of the photographic lens, wherein the number of the aforesaid rangefinder spots contributing to focal adjustment of the photographic lens is changed by automatically depending upon the object distance, whereby focusing is properly performed by taking into account the number of laterally spaced objects in a target area and the back- or fore-ground by a very simple operation.

29 Claims, 8 Drawing Figures

FIG.3 (a) OSC
FIG.3 (b) DIV
FIG.3 (c) LED
FIG.3 (d) LSB
FIG.3 (e) CNT | 0 | 1 | 2 | 3 | 4 | 5 | 6 | 7 | 8 | 9 | 10 |

4,637,705

AUTOMATIC FOCUSING CAMERA

BACKGROUND OF THE INVENTION

1. Field of the Invention

This invention relates to a distance measuring device for automatic focus detection, particularly in leaf shutter type cameras, capable of measuring the distance of a plurality of objects existing at different positions.

2. Description of the Prior Art

Conventionally, distance measuring devices for cameras which automatically measure the distance to an object to be photographed have only one area in the field of view of the finder at a certain location (hereinafter called a "rangefinder spot"). In this case, if the rangefinder spot is of a small size, since one object is aimed at in the spot, its distance can be accurately measured without the influence of miscellaneous subjects within the neighbourhood. In some cases, however, it happens that instead of catching the subject of principal photographic concern, the distance measuring device is rendered responsive to the environment thereof. For example, when snapping two persons at a time, since the background between the persons reaches the spot, the camera is focused at infinity. In another device having a rangefinder spot of a large size, on the other hand, no matter how careful the photographer may be in aligning the device, it often measures the distance of a subject of little concern, for example, the foreground. Neither device has allowed accurate and reliable distance measurement while permitting relaxed shootings and, therefore, has failed to produce sharply focused photographs.

With the foregoing in mind, the object of the present invention is to provide a camera having a target area with a plurality of points to be measured in distance contributing to focal adjustment of a photographic lens, wherein means is provided for varying the number of points which contribute to the aforesaid focal adjustment of the photographic lens as a function of the object distance, thereby giving the advantage of assuring proper focal adjustment by very simple manipulation, since the number of subjects of photographic principal concern to be shot at one time and the background or the like are discriminately taken into account by the varying means.

Other objects of the invention will become apparent from the following description of an embodiment thereof.

SUMMARY OF THE INVENTION

An automatic focusing camera including light projecting means for projecting a signal light toward an object to be photographed; deflecting means for deflecting the projection of the signal light from the light projecting means to discrete directions successively; photosensitive means for receiving the reflection of the signal light from the object, the photosensitive means including a plurality of photosensitive elements positioned to receive the reflections from target points existing only in respective certain prescribed directions; focusing adjustment information forming means responsive to detection of object distance information from the output states of the plurality of photosensitive elements related to the reflected position of the signal light by the deflecting means for forming focusing adjustment information for a photographic lens; and selecting means for selecting those of the plurality of photosensitive elements which contribute to formation of the focusing adjustment information depending upon the deflected position of the deflecting means so that the size of a distance measurable area within a picture frame is varied as a function of the distance.

BRIEF DESCRIPTION OF THE DRAWINGS

The drawing illustrate an embodiment of a distance measuring device for a camera according to the present invention.

DETAILED DESCRIPTION OF THE PREFERRED EMBODIMENT

Figure 1:
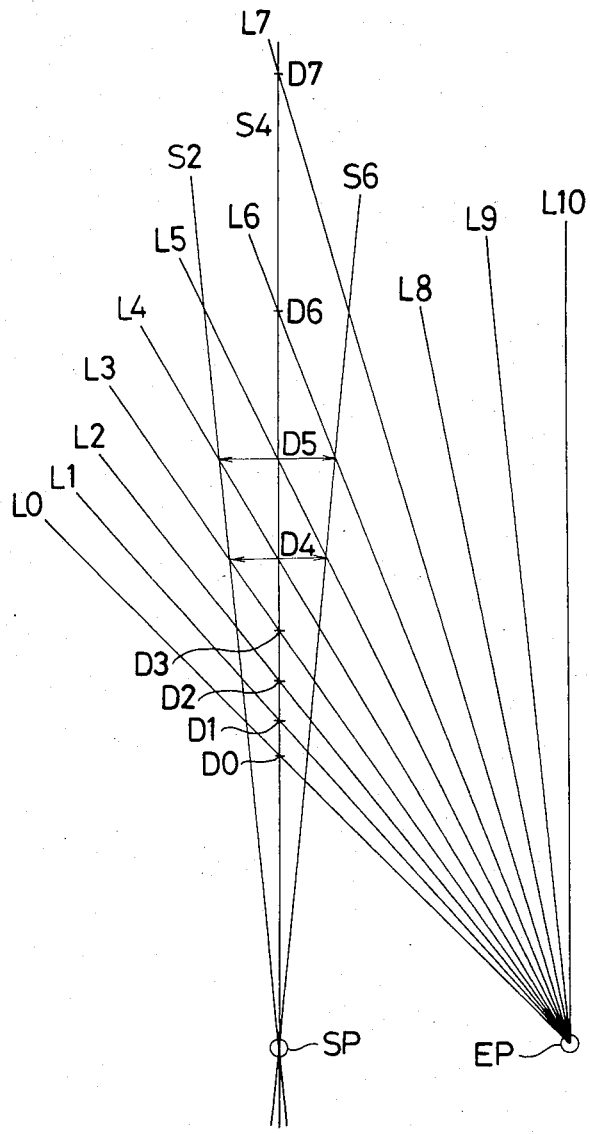
FIG. 1 is a diagram illustrating the principle of distance measurement.
Figure 2:
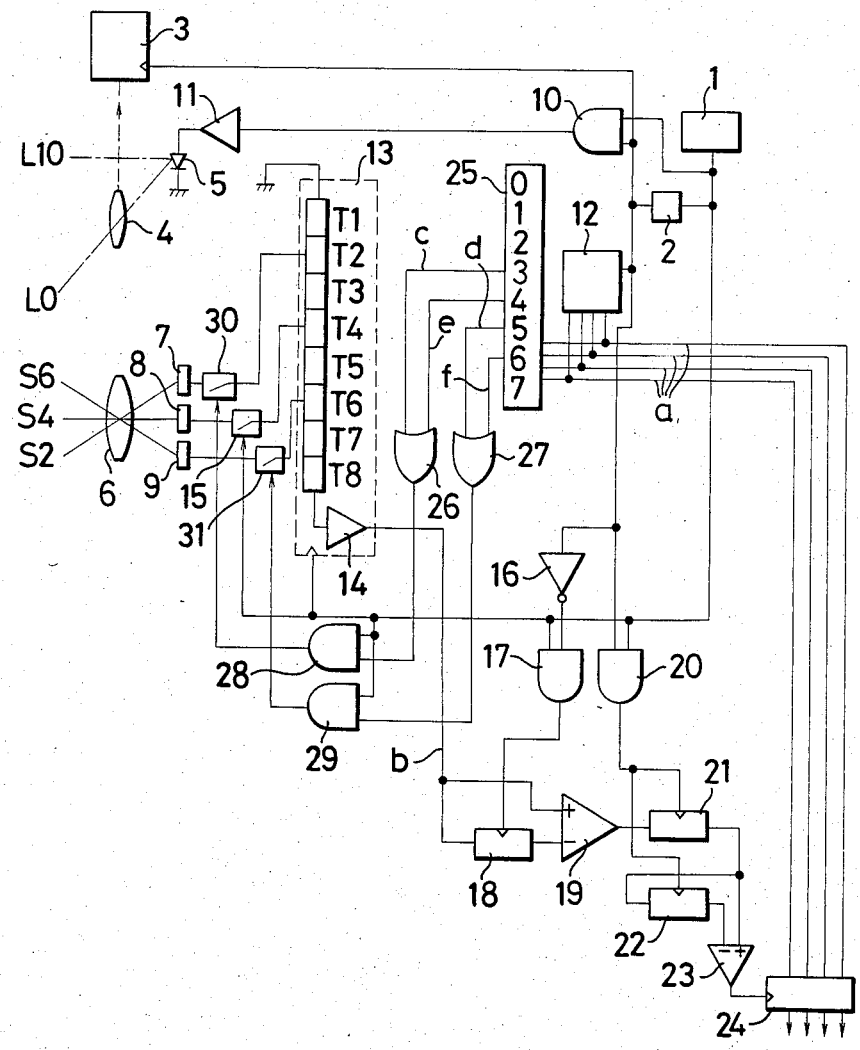
FIG. 2 is an electrical circuit diagram, partly in block form, of the device.
Figure 3:
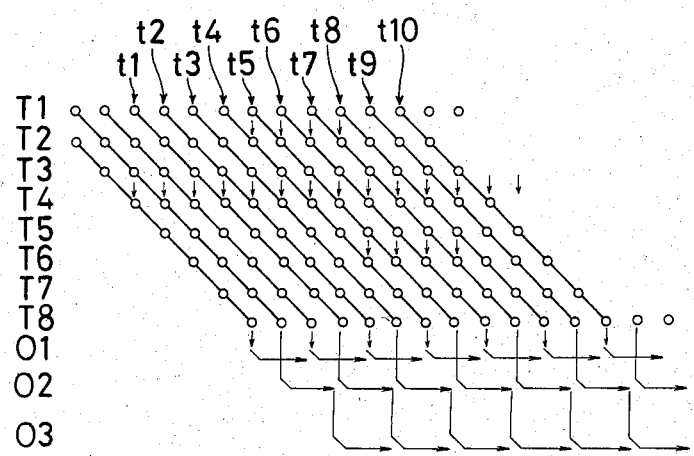
FIGS. 3(a) to 3(f) are pulse timing charts illustrating a manner in which the circuit of FIG. 2 operates.

The present invention is described in detail in conjunction with an embodiment thereof by reference to FIGS. 1 to 3.

In FIG. 1 there is schematically shown one embodiment of a distance measuring method according to the present invention, where a light beam is projected from a point EP, and a target area is observed at a point SP spaced from the point EP by the base length. That is, when the intersection point of the path of light projection from the point EP and the path of light reflection to the point SP coincide with an object, its distance is found. Here, the projecting light beam is deflected successively in discrete radial directions labelled L0 to L10, while its reflection is observed in three axes S2, S4 and S6 of different angular directions. If the object lies at any of intersection points D0 to D10 (D8, D9 and D10 are not shown), its distance is evaluated in the form of a corresponding angle of deflection of the projecting light beam. In other words, with the object existing at the point D6, when the light beam is projected at the angle of deflection L6, it is reflected from the object and passes along the axis of observation S4, being received in the point SP. This angle of deflection L6 represents the distance from the camera to the object.

To eliminate the above-described problem, according to the present invention for the two distances D4 and D5 which are frequently in shooting two or more persons at a time, observation is made not only along the target sweep path S4 but also along the additional two target sweep paths S2 and S6 of different angular positions, flanking to either side of the first one S4.

For this purpose, a practical example of an electrical circuit is constructed as shown in FIG. 2. The output of an oscillator 1 is halved in frequency by a frequency divider 2. The output of the latter is applied to a drive unit 3, for example, a pulse motor-operated mechanism, by which a projection lens 4 is moved stepwise so that the axis of light projection from a light emitting diode 5 is deflected in a manner shown by L0 to L10 in FIG. 1. Positioned behind a collection lens 6 are photo-electric transducer elements 7, 8 and 9 to define the aforesaid three target sweep paths S2, S4 and S6. The output of each of these photo-electric transducer elements 7, 8 and 9 is proportional to the intensity of the reflected light from the target area.

As shown in FIG. 3(a), the oscillator 1 produces a train of pulses OSC. Receptive of the pulses OSC, the frequency divider 2 produces an output DIV shown in FIG. 3(b) which is applied through an AND gate 10 and an amplifier 11 to the light-emitting diode 5, whereby it is lit intermittently as a signal LED shown in FIG. 3(c), in synchronization with the stepwise movement of the projection lens 4 by the drive unit 3, or successive discrete deflection of the axis of the projecting light beam from L0 to L10. A counter 12 counts the pulses DIV in a way shown by CNT in FIG. 3(e), and its output is produced at four signal lines "a" of FIG. 2 in the form of a binary number. At the same time, the outputs of the photo-electric transducer elements 7, 8 and 9 are either selectively or transferred in parallel to an analog shift register 13, such as CCD at elements T2, T4 and T6 respectively. The shift register 13 including the serially connected register elements T1 to T8 adds and shifts information, as shown by oblique lines in FIG. 3(f), to sequentially produce serial signals.

When the output OSC of the oscillator 1 is of a high level, an analog switch 15 is closed, thereby the output of the photo-electric transducer element 8 for the central target sweep path S4 is transferred to and accumulated on the register element T4 to be shifted at each clock. Strictly speaking, at a point of time t1 in synchronization with one of the pulses OSC of the oscillator 1 which coincides with 1 in the content CNT of the counter 12, the light-emitting diode 5 is de-energized with the lens 4 set in the projection optical path L1. From this time point t1 onward, the output of the photo-electric transducer element 8 is accumulated on the register element T4 until that pulse OSC terminates. Then, the charge in the register element T4 is shifted to the next register element T5. At the leading edge of the next pulse OSC, or a point of time t2, which also coincides with [1] in the content CNT of the counter 12, the light-emitting diode 5 is energized with the projection lens 4 in the optical path L1. During this second integration period, the output of the photoelectric transducer element 8 is again transferred to and accumulated on the register element T4.

This procedure repeats itself, so that it is at a point of time t5 that the charge, which was accumulated on the register element T4 during the first integration period beginning with the first time point t1, reaches the last register element T8 and therefrom is output to a signal line "b" by an amplifier 14 operating as an output buffer. Since, at this time, the output DIV of the frequency divider 2 is at a low level, the output of a NOT gate 16 takes a high level, and, therefore, an AND gate 17 produces an output of a high level. Thus, the charge information of the first integration period is stored on a sample and hold circuit 18, as shown by an arrow of bent tail on a line "01" in FIG. 3(f). At a next point of time t6, the charge information representing the amount of light integrated during the second period with the projection of light beam along the optical path L1 in the target sweep path S4 is then output to the signal line "b". This output is compared with the output of the sample and hold circuit 18 by a difference amplifier 19 to remove the ambient light component from the reflection of the complex light. Therefore, the output of the difference amplifier 19 represents the reflection of the projected radiation alone. Since, at this point of time t6, the output DIV of the frequency divider 2 is at a high level, and the output OSC of the oscillator 1 is also at a high level, another AND gate 20 produces an output of a high level. Responsive to this, another sample and hold circuit 21 stores the information of the reflection of the projected radiation, as shown by an arrow of bent tail on a line "02" in FIG. (f)

Accordingly, only the quantity of the proper reflection of radiation which is the difference between the reflections at the time of projection and non-projection on the same axis of observation is accurately obtained, so that the reflection of radiation can be detected independent from the proper object brightness.

At a point of time t8, this information is then transferred to and stored in another sample and hold circuit 22. After this, the next information representing the reflection of the projected radiation alone in the optical paths L2 and S4 enters the sample and hold circuit 21, as shown on the line "02" and a line "03" in FIG. 3(f).

The outputs of the sample and hold circuits 21 and 22 are then compared by a comparator 23. If the former or the amount of radiation reflected from the intersection point of the paths L2 and S4 is higher than the latter or the amount of radiation reflected from the intersection point of the paths L1 and S4, since the object is found to lie at the point D2, the comparator 23 produces a high output level. Responsive to this, a D flip-flop circuit 24 memorizes a concurrent binary number corresponding, in this instance, to [5] from the signal lines "a".

This is, the object lines at the distance D2 of FIG. 1, determine whether or not the binary coded decimal number [5] is memorized. As the target points D2 to D10 have to be swept until the last, after the counter 12 has counted [13], the D flip-flop circuit 24 produces an output representing the sum of [the number of the subscript of the reference for the distance at which a farther one of the objects lines]+[3]. This output forms focusing information on the photographic lens. In other words, this output can be used for automation of the focusing operation when the photographic lens is moved for focusing to a position corresponding to [the sum −3]. It is also to be noted that, to begin with, an initial value, for example, [10] corresponding to the distance D7, as a normal focal distance, may be set in the D flip-flop circuit 24, in order to insure that even when no object distance is found, automatic focusing does not result in setting the lens very for out of focus.

Next, the possibility of easily achieving variation of the lateral width of the target area with variation of the object field is described. That is, the conventional distance measuring device with a narrow rangefinder area has a drawback which is often encountered when two persons are shot at a time. In the present invention, for a middle range of distances from such an object field condition in which eight-tenths of the height of the two persons can be photographed (for example, 3 meters) to the shooting of several tens of persons (for example, 8 meters), the target area is laterally extended to achieve correct distance measurement when several persons constitute the subject of photographic principal interest along with some landscape.

On the assumption that the distances D4 and D5 of FIG. 1 correspond to the respective terminal ends of that object distance range, the term "lateral extension of the target area" at the distance D4 under the condition that one and the same light projecting mechanism is used is to receive the reflection of the projected radiation from the intersection points of the paths L3 and S2, the paths L4 and S4 and the paths L5 and S6. Similarly, when the reflections of the projected radiation from the intersection points of the paths L4 and S2, the paths L4 and S4 and the paths L6 and S6 are received, it is possible to realise a lateral extension of the target area at the distance D5.

For this purpose, in the embodiment of the invention, the output of the photoelectric transducer element 7 for the intersection point of L3 and S2, the output of the photoelectric transducer element 8 for the intersection point of L4 and S4, and the output of the photo-electric transducer element 9 for the intersection point of L5 and S6 are summed up to determine the reflection of the projected radiation from the object distance D4. That is, by a decoder 25, each of the pairs of successive two time points corresponds uniquely to one of the outputs CNT of the counter 12. For a counted value CNT of [3], an output signal line "c" has a high level. Similarly, for another counted value CNT of [5], another output signal line "d" has a high level. These outputs are applied through OR gates 26 and 27 to AND gates 28 and 29 respectively. In the same timing when the analog switch 15 is closed, the outputs of the AND gates 28 and 29 are changed to a high level, thereby analog switches 30 and 31 are closed in order that the outputs of the photo-electric transducer elements 7 and 9, after having been sent to the register elements T2 and T6 respectively, are added to that of the photo-electric transducer element 8.

This should be explained in more detail by reference to FIG. 3(f). At the point of time t5 and t6, information addition to the register element T2 is carried out. At the points of time t9 and t10, information addition to the register element T6 is carried out. Since the register elements T1 to T8 constitute a synchronized analog shift register, it is at the point of time t7 and t8 for a counted value CNT of [4] that the outputs of the photo-electric transducer element 8, which represent respectively the reflections of the ambient light and the radiation plus ambient light in the path S4, are added to the respective information of the paths S2 and S6. At a time when the counted value is [7], the sample and hold circuit 21 produces an output representing the reflection of the projected radiation as sensed by the three axes of observation.

If the object lies not at the distance D3, but at the distance D4, the output of the sample and hold circuit 21 takes a higher value than that of the sample and hold circuit 22 which represents the reflection of the projected radiation from the intersection point of the paths L3 and S4, the comparator 23 sets the D flip-flop circuit 24 in memorizing the counted value of [7].

Similarly, output lines "e" and "f" of the decoder 25 become high level when the counted value CNT is [4] or [6]]respectively. Therefore, the target area at the distance D5 is laterally swept in a line passing through the intersection points of the paths L4 and S2, L5 and S4, and L6 and S6. At the point of time when the counted value is [8], the comparator 23 then produces an output representing the reflection of the projected radiation from the object distance D5.

The present invention is not confined to the above-described embodiment. It is, of course, possible to vary of the circuit means. For example, instead of using the pulse operated drive unit 3, a mechanical scanning means may be used. In this case, the oscillator 1, the frequency divider 2 and the counter 12 can be replaced by a code plate. Another variation is that the comparator 23 may be operated with a threshold level which is made variable by taking into account the distance and the field of observation. Still another variation is that the number of intersection points in the lateral target sweep path may be increased from 3 to any larger desired value. In the illustrated embodiment, as the longitudinal target is swept, when the object distance is detected, the content of the counter 12 is latched. Instead, it is also possible to stop a scanning type focusing mechanism for the photographic lens in response to the output of the comparator 23, provided that the information delay of the shift register 13 is compensated for.

Another approach to the variation of the length of the lateral target sweep path as a function of the object distance is that the corresponding number of light beams to the number of intersection points of the optical paths in the lateral target sweep path are projected at a time onto the intersection points, and the corresponding number of photosensitive elements 7, 8, 9 such as a position sensitive device (P.S.D.) capable of detecting where the reflections of the projected light beams arrive to the number of intersection points used, wherein only those outputs of the aforesaid P.S.D. which, corresponding to the necessary intersection points, contribute to focusing adjustment information, whereby without having to deflect the projecting light beam, one time of light projection suffices for realizing the present invention. As the method of varying the distance finding area within the field of view of the finder as a function of the object distance, besides the above, instead of using the individual elements of the aforesaid P.S.D., it is also possible to use only one photosensitive element in combination with an optical system of which the optical axis is selectively aligned to the target points. Further the present invention is applicable to the so-called passive type distance measuring devices in which the object brightness is received to measure the object distance and only the distance information at the necessary points is selected. In any case, what is essential to the possibility of application of the present invention is that the distance measuring device has a system capable of selecting the places of which the distances are to be measured, no matter what type it may belong to.

As has been described above, the distance measuring device according to the present invention has a capability of controlling the width of the target area in accordance with the distance to be measured, which can realize an automatic focusing adjustment with higher accuracy and reliability in which the number of objects, the landscape, etc. are taken into consideration. Further, if the signals representing the reflection of the projected light are processed by an analog shift register such as CCD, it is easily made possible to sweep the target area laterally while still maintaining the removal of the influence of the ambient light with which an object to be photographed is illuminated to be achieved.

What is claimed is:
1. An automatic focusing camera comprising:
 (a) light projecting means for projecting a signal light toward an object to be photographed;
 (b) deflecting means for deflecting the projection of the signal light from said light projecting means to discrete directions successively;
 (c) photosensitive means for receiving the reflection of said signal light from the object, said photosensitive means including a plurality of photosensitive elements positioned to receive the reflections from target points existing only in respective certain prescribed directions;
 (d) focusing adjustment information forming means responsive to detection of an object distance information from the output states of said plurality of photosensitive elements related to the reflected position of the signal light by said deflecting means for forming a focusing adjustment information for a photographic lens; and (e) selecting means for selecting those of said plurality of photosensitive elements which contribute to a formation of the focusing adjustment information depending upon the deflected position of said deflecting means so that the size of a distance measurable area within a picture frame is varied as a function of the distance.

2. A camera according to claim 1, wherein said deflecting means includes an optical system for light projection arranged to move in such a way as to deflect the projection of the signal light to discrete directions successively.

3. A camera according to claim 1, wherein said focusing adjustment information forming means includes an analog shift register into which the outputs of said plurality of photosensitive elements are put and serially shifted.

4. A camera according to claim 3, wherein said focusing adjustment information forming means includes computing means for computing the object distance based on that position of said analog shift register which contains a signal of maximum value.

5. A camera according to claim 1, wherein said focusing adjustment information forming means includes subtracting means for computing the difference between the outputs of each of said photosensitive elements when said light projecting means does and does not project the signal light in any one of the deflected position of said deflecting means.

6. A camera according to claim 1, wherein said selecting means includes switching means for allowing the outputs of only prescribed ones of said plurality of photosensitive elements depending on the deflected position of the signal light by said defelecting means.

7. A camera according to claim 3, wherein said selecting means includes switching means for applying the outputs of only the prescribed ones of said plurality of photosensitive elements which depend on the deflected position of the signal light by said deflecting means to said analog shift register.

8. A camera according to claim 1, wherein said selecting means includes means for extending the distance measurable area within said picture frame in a particular distance range.

9. A camera according to claim 8, wherein said area extending means is arranged to operate when said particular distance range is an intermediate region of the entire distance range.

10. A distance measuring device for a camera, comprising:

(a) signal projection means for projecting a distance measurement signal toward a first area and a second area in a picture scene;

(b) signal receiving means for determining an object distance by receiving a reflected signal of the distance measurement signal projected from said signal projection means; and (c) restriction means for causing the signal receiving means to neglect the object distance if the object is not at a predetermined distance in connection with the second area within the picture scene.

11. A device according to claim 10, wherein the signal receiving means includes a first signal receiving portion for receiving the reflected signal from the first area and a second signal receiving portion for receiving the reflected signal from the second area, and wherein the restriction means includes inhibition means for inhibiting the output of the second signal receiving portion if the second signal receiving portion receives the reflected signal from a distance other than the predetermined distance.

12. A device according to claim 11, wherein the inhibition means includes a switch.

13. A device according to claim 10, wherein the restriction means sets the predetermined distance as an intermediate distance.

14. A device according to claim 13, wherein the intermediate distance is about 3 to 8 meters.

15. A device according to claim 10, wherein the signal receiving means includes discriminating means for outputting a predetermined object distance when the distance measurement is impossible.

16. A device according to claim 10, wherein the signal projection means includes a signal generating portion and an optical system for projecting the signal output from the signal generating portion toward the first area and a second within the picture scene.

17. A device according to claim 10, wherein the signal receiving means includes a signal receiving portion for receiving the reflected signal and a shift resistor for transmitting the output of the signal receiving portion.

18. A device according to claim 10, wherein the signal projecting means includes an intermittent projection circuit for intermittently projecting the distance measurement signal, and the signal receiving means includes an exterior light removing circuit for removing an exterior light in synchronism with the intermittent projection.

19. A device according to claim 10, wherein the signal projecting means includes illumination means for projecting the distance measurement signal as a signal light.

20. A distance measuring device, comprising:

(a) signal projection means for projecting a distance measurement signal toward a first area and a second area in a picture scene;

(b) signal receiving means for determining an object distance by receiving a reflected signal of the distance measurement signal projected from said signal projection means; and (c) restriction means for causing the signal receiving means to neglect the object distance if the object is not at a predetermined distance in connection with the second area within the picture scene.

21. A device according to claim 20, wherein the signal receiving means includes a first signal receiving portion for receiving the reflected signal from the first area, and a second signal receiving portion for receiving the reflected signal from the second area, and the restriction means includes inhibition means for inhibiting the output of the second signal receiving portion if the reflected signal is received from a distance other than the predetermined distance.

22. A device according to claim 21, wherein the restriction means includes a switch.

23. A device according to claim 20, wherein the restriction means sets the predetermined distance as an intermediate distance.

24. A device according to claim 23, wherein the intermediate distance is about 3 to 8 meters.

25. A device according to claim 20, wherein the signal receiving means includes a discriminating means for outputting a predetermined object distance if the distance measurement is impossible.

26. A device according to claim 20, wherein the signal projection means includes a signal generating portion and an optical system for projecting a signal output from the signal generating portion toward the first and second areas in the picture scene.

27. A device according to claim 20, wherein the signal receiving means includes a signal receiving portion for receiving the reflected signal and a shift resistor for transmitting the output of the signal receiving portion.

28. A device according to claim 20, wherein the signal projection means includes an intermittent projection circuit for intermittently projecting the distance measurement signal, and an external light removing circuit for removing an external light in synchronism with the intermittent projection.

29. A device according to claim 20, wherein the signal projection means includes illumination means for projecting the distance measurement signal as a signal light.

* * * * *